United States Patent
Kaiser et al.

(10) Patent No.: US 10,782,138 B2
(45) Date of Patent: Sep. 22, 2020

(54) METHOD, APPARATUS, AND COMPUTER PROGRAM PRODUCT FOR PEDESTRIAN BEHAVIOR PROFILE GENERATION

(71) Applicant: HERE Global B.V., Eindhoven (NL)

(72) Inventors: Christof Kaiser, Eindhoven (NL); Sanjay Kumar Boddhu, Aurora, IL (US); Kevin Johnson, Chicago, IL (US); Davide Pietrobon, Berkeley, CA (US); Noelle Risberg Scilley, Chicago, IL (US)

(73) Assignee: HERE Global B.V., Eindhoven (NL)

(*) Notice: Subject to any disclaimer, the term of this patent is extended or adjusted under 35 U.S.C. 154(b) by 351 days.

(21) Appl. No.: 15/726,606

(22) Filed: Oct. 6, 2017

(65) Prior Publication Data

US 2019/0108753 A1 Apr. 11, 2019

(51) Int. Cl.
*G08G 1/16* (2006.01)
*B60Q 9/00* (2006.01)
(Continued)

(52) U.S. Cl.
CPC .............. *G01C 21/34* (2013.01); *B60Q 9/00* (2013.01); *B60W 30/095* (2013.01);
(Continued)

(58) Field of Classification Search
CPC .... G08G 1/0129; G08G 1/0141; G08G 1/012; G08G 1/0112; B60W 50/14;
(Continued)

(56) References Cited

U.S. PATENT DOCUMENTS 8,547,249 B2 10/2013 David et al.
9,248,834 B1 2/2016 Ferguson et al.
(Continued)

FOREIGN PATENT DOCUMENTS

WO WO 2016/189112 A1 12/2016

OTHER PUBLICATIONS

Brouwer, N. et al., *Comparison and Evaluation of Pedestrian Motion Models for Vehicle Safety Systems*, 2016 IEEE 19th International Conference on Intelligent Transportation Systems (ITSC) (Nov. 2016) 2207-2212.
(Continued)

*Primary Examiner* — Mussa A Shaawat
(74) *Attorney, Agent, or Firm* — Alston & Bird LLP

(57) ABSTRACT

A method, apparatus, and computer program product are described herein for determining pedestrian behavior profiles for road segments of a road network, from those pedestrian behavior profiles, determining the likelihood that an adverse pedestrian event will occur, and determining the action to be taken in response. Example embodiments may provide a mapping system including: a memory having map data; and processing circuitry. The processing circuitry may be configured to: receive data points associated with pedestrian movement; associate pedestrian movement with a road segment; determine, based on the data points, a pedestrian behavior profile for the road segment; and in response to the pedestrian behavior profile for the road segment indicating a likelihood for an adverse pedestrian event that satisfies a predetermined likelihood, cause at least one action in response thereto.

20 Claims, 4 Drawing Sheets

(51) Int. Cl.
  *B60W 30/095* (2012.01)
  *B60W 30/14* (2006.01)
  *B60W 30/18* (2012.01)
  *G01C 21/34* (2006.01)
  *G08G 1/01* (2006.01)
  *G08G 1/0967* (2006.01)
  *G07C 5/00* (2006.01)
  *G01C 21/36* (2006.01)
  *H04W 4/02* (2018.01)

(52) U.S. Cl.
  CPC .......... *B60W 30/14* (2013.01); *B60W 30/18* (2013.01); *G01C 21/3415* (2013.01); *G01C 21/3461* (2013.01); *G01C 21/3697* (2013.01); *G07C 5/008* (2013.01); *G08G 1/012* (2013.01); *G08G 1/0112* (2013.01); *G08G 1/0129* (2013.01); *G08G 1/0141* (2013.01); *G08G 1/096725* (2013.01); *G08G 1/096775* (2013.01); *H04W 4/02* (2013.01)

(58) Field of Classification Search
  CPC ........ B60W 30/14; B60W 4/02; B60W 30/18; B60W 30/09; B60W 30/095; B60Q 5/006; B60Q 9/00; B60Q 9/008; B60Q 1/08; G07C 5/008; G01C 21/34; G01C 21/3415
  See application file for complete search history.

(56) References Cited

U.S. PATENT DOCUMENTS

| | | | |
|---|---|---|---|
| 9,349,293 | B2 | 5/2016 | Beaurepaire et al. |
| 9,481,366 | B1 | 11/2016 | Gordon et al. |
| 9,483,948 | B1 | 11/2016 | Gordon et al. |
| 9,505,412 | B2 | 11/2016 | Bai et al. |
| 9,517,767 | B1 * | 12/2016 | Kentley ............ B60R 21/01 |
| 9,630,619 | B1 * | 4/2017 | Kentley ............ B60W 30/09 |
| 9,701,239 | B2 * | 7/2017 | Kentley ............ B60N 2/002 |
| 10,147,320 | B1 * | 12/2018 | Ellis ................ G08G 1/164 |
| 10,292,136 | B2 * | 5/2019 | Rubin .............. H04W 72/005 |
| 2006/0041381 | A1 * | 2/2006 | Simon ............... G01S 13/931 701/301 |
| 2008/0097699 | A1 * | 4/2008 | Ono ................ B60R 21/0134 701/300 |
| 2011/0246156 | A1 | 10/2011 | Zecha et al. |
| 2017/0120804 | A1 * | 5/2017 | Kentley ............ G05D 1/0088 |
| 2017/0120814 | A1 * | 5/2017 | Kentley ............ G10K 11/346 |
| 2017/0120904 | A1 * | 5/2017 | Kentley ............ G01C 21/32 |
| 2017/0274908 | A1 * | 9/2017 | Huai ................ G05D 1/0214 |
| 2017/0336791 | A1 * | 11/2017 | Huai ................ B60W 50/0098 |
| 2019/0250623 | A1 * | 8/2019 | Kentley-Klay ........ B60N 2/002 |

OTHER PUBLICATIONS

Volz, B. et al., *Feature Relevance Estimation for Learning Pedestrian Behavior at Crosswalks*, 2015 IEEE 18$^{th}$ International Conference on Intelligent Transportation Systems (2015) 854-860.

* cited by examiner

METHOD, APPARATUS, AND COMPUTER PROGRAM PRODUCT FOR PEDESTRIAN BEHAVIOR PROFILE GENERATION

TECHNOLOGICAL FIELD

An example embodiment of the present invention relates to determining pedestrian behavior profile, and more particularly, to providing information regarding pedestrian behavior profiles to a device associated with a vehicle to facilitate the avoidance of vehicle-pedestrian accidents.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision-making.

Data received from infrastructure monitoring systems and crowd-sourced data has become ubiquitous and may be available for facilitating route guidance and navigation system information. However, this data can be mined to provide various other services to users and to grow the availability of location-based services.

BRIEF SUMMARY

A method, apparatus, and computer program product are provided in accordance with an example embodiment described herein for determining pedestrian behavior profiles for road segments of a road network, from those pedestrian behavior profiles, determining the likelihood that an adverse pedestrian event will occur, and determining the action to be taken in response. Example embodiments may provide a mapping system including: a memory having map data; and processing circuitry. The processing circuitry may be configured to: receive data points associated with pedestrian movement; associate pedestrian movement with a road segment; determine, based on the data points, a pedestrian behavior profile for the road segment; and in response to the pedestrian behavior profile for the road segment indicating a likelihood for an adverse pedestrian event that satisfies a predetermined likelihood, cause at least one of the following: re-routing a route to a destination that includes the road segment to a route to the destination that does not include the road segment; performance of an evasive maneuver by a vehicle; or provision of an alert to a driver of a vehicle traveling along the road segment. The processing circuitry configured to determine a pedestrian behavior profile for the road segment may include determining a likelihood for an adverse pedestrian event, where the likelihood for an adverse pedestrian event varies over at least one of: time of day, day of the week, or month of the year.

The mapping system of some embodiments may include processing circuitry configured to: determine the presence of a pedestrian along the road segment; and establish a likelihood of the pedestrian performing an adverse pedestrian event based, at least in part, on the pedestrian behavior profile for the road segment. The processing circuitry configured to determine the presence of a pedestrian along the road segment may include processing circuitry configured to determine a direction of travel of a pedestrian along the road segment, and the processing circuitry configured to establish a likelihood of the pedestrian performing an adverse pedestrian event may be based, at least in part, on the direction of travel of the pedestrian.

According to some embodiments, the processing circuitry configured to determine a pedestrian behavior profile for the road segment may include processing circuitry configured to: determine pedestrian accessible paths for the road segment; and determine the pedestrian behavior profile based, at least in part, on the pedestrian accessible paths of the road segment. An evasive maneuver may include one or more of: changing a travel lane of a vehicle; repositioning a vehicle in a width of a lane of travel relative to a pedestrian walkway; or adjusting a speed of a vehicle. In response to the pedestrian behavior profile for the road segment indicating a likelihood for an adverse pedestrian event that satisfies a predetermined likelihood, cause at least one of: activating lights of a vehicle traveling along the road segment; or activating an audible tone of a vehicle traveling along the road segment. An adverse pedestrian event may include a pedestrian entering a vehicle travel lane of the road segment.

Embodiments of the present invention may provide an apparatus including at least one processor and at least one memory including computer program code. The at least one memory and the computer program code may be configured to, with the processor, cause the apparatus to: receive data points associated with pedestrian movement; associate pedestrian movement with a road segment; determine, based on data points, a pedestrian behavior profile for the road segment; and in response to the pedestrian behavior profile for the road segment indicating a likelihood for an adverse pedestrian event that satisfies a predetermined likelihood, cause the apparatus to perform at least one of the following: re-route a route to a destination that includes the road segment to a route to the destination that does not include the road segment; cause an evasive maneuver to be performed by a vehicle; or provide an alert to a driver of a vehicle traveling along the road segment. Causing the apparatus to determine a pedestrian behavior profile for the road segment may include causing the apparatus to determine a pedestrian likelihood for an adverse pedestrian event, where the likelihood for an adverse pedestrian event varies over at least one of: time of day, day of the week, or month of the year.

According to some embodiments, the apparatus may be caused to: determine the presence of a pedestrian along the road segment; and establish a likelihood of the pedestrian performing an adverse pedestrian event based, at least in part, on the pedestrian behavior profile for the road segment. Causing the apparatus to determine the presence of a pedestrian along the road segment may include causing the apparatus to determine a direction of travel of a pedestrian along the road segment, and causing the apparatus to establish a likelihood of the pedestrian performing an adverse pedestrian event may be based, at least in part, on the direction of travel of the pedestrian. Causing the apparatus to determine a pedestrian behavior profile for the road segment may include causing the apparatus to: determine pedestrian accessible paths for the road segment; and determine the pedestrian behavior profile based, at least in part, on the pedestrian accessible paths of the road segment.

According to some embodiments, an evasive maneuver may include one or more of: changing a travel lane of a vehicle; repositioning a vehicle in a width of a lane of travel relative to a pedestrian walkway; or adjusting a speed of a vehicle. In response to the pedestrian behavior profile for the road segment indicating a likelihood for an adverse pedestrian event that satisfies a predetermined likelihood, cause at least one of activating lights of a vehicle traveling along the road segment or activating an audible tone of a vehicle traveling along the road segment. An adverse pedestrian event may include a pedestrian entering a vehicle travel lane of the road segment.

Embodiments described herein may provide a computer program product including at least one non-transitory computer-readable storage medium having computer-executable program code portions stored therein. The computer-executable program code portions including program code instructions configured to: receive data points associated with pedestrian movement; associate pedestrian movement with a road segment; determine, based on the data points, a pedestrian behavior profile for the road segment; and in response to the pedestrian behavior profile for the road segment indicating a likelihood for an adverse pedestrian event that satisfies a predetermined likelihood, cause the apparatus to perform at least one of the following: re-route a route to a destination that includes the road segment to a route to the destination that does not include the road segment; cause an evasive maneuver to be performed by a vehicle; or provide an alert to a driver of a vehicle traveling along the road segment.

According to some embodiments, the program code instructions to determine a pedestrian behavior profile for the road segment may include program code instructions to determine a likelihood for an adverse pedestrian event, where the likelihood for an adverse pedestrian event varies over at least one of time of day, day of the week, or month of the year. Embodiments may include program code instructions to: determine the presence of a pedestrian along the road segment; and establish a likelihood of the pedestrian performing an adverse pedestrian event based, at least in part, on the pedestrian behavior profile for the road segment. The program code instructions to determine the presence of a pedestrian along the road segment may include program code instructions to determine a direction of travel of a pedestrian along the road segment, and the program code instructions to establish a likelihood of the pedestrian performing an adverse pedestrian event may be based, at least in part, on the direction of travel of the pedestrian.

BRIEF DESCRIPTION OF THE DRAWINGS

Figure 1:
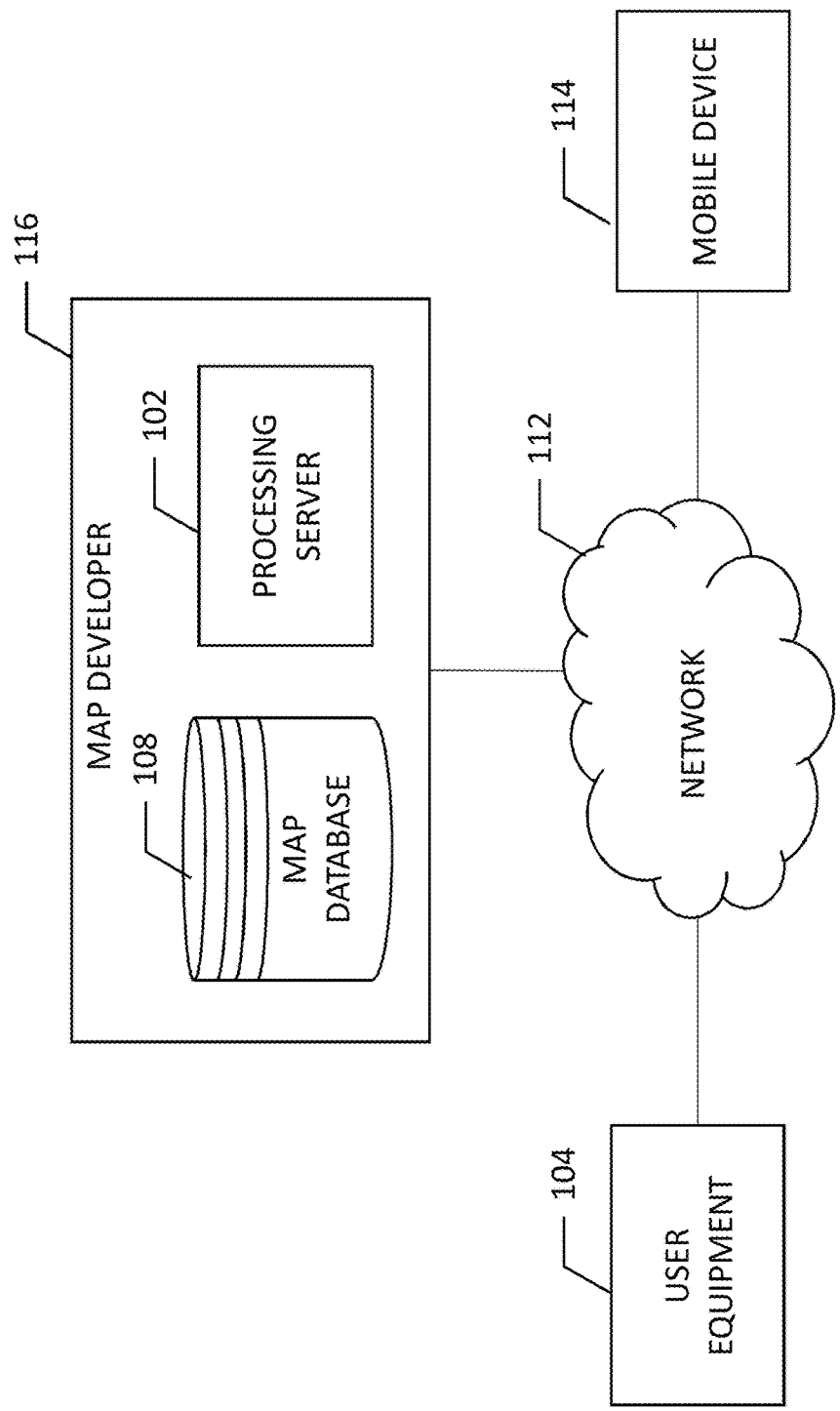
Figure 2:
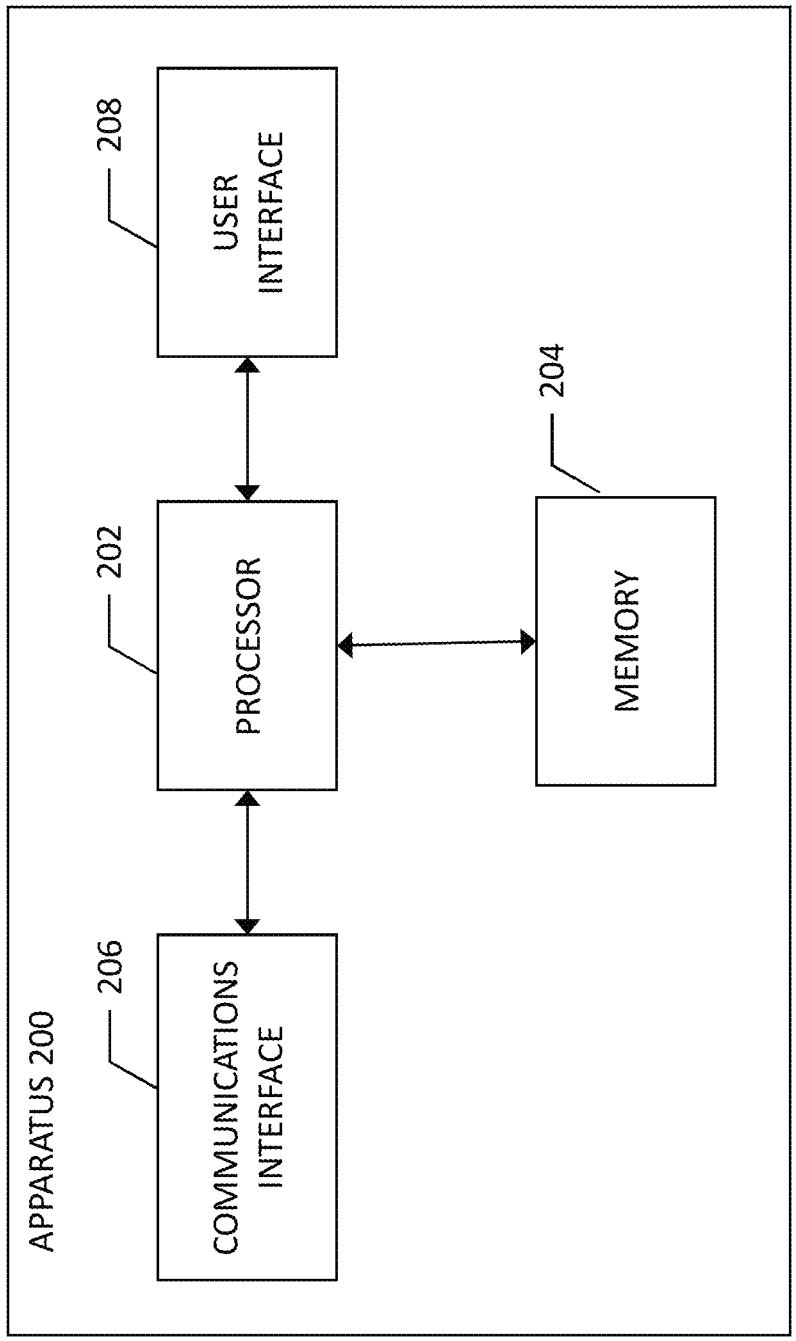
Figure 3:
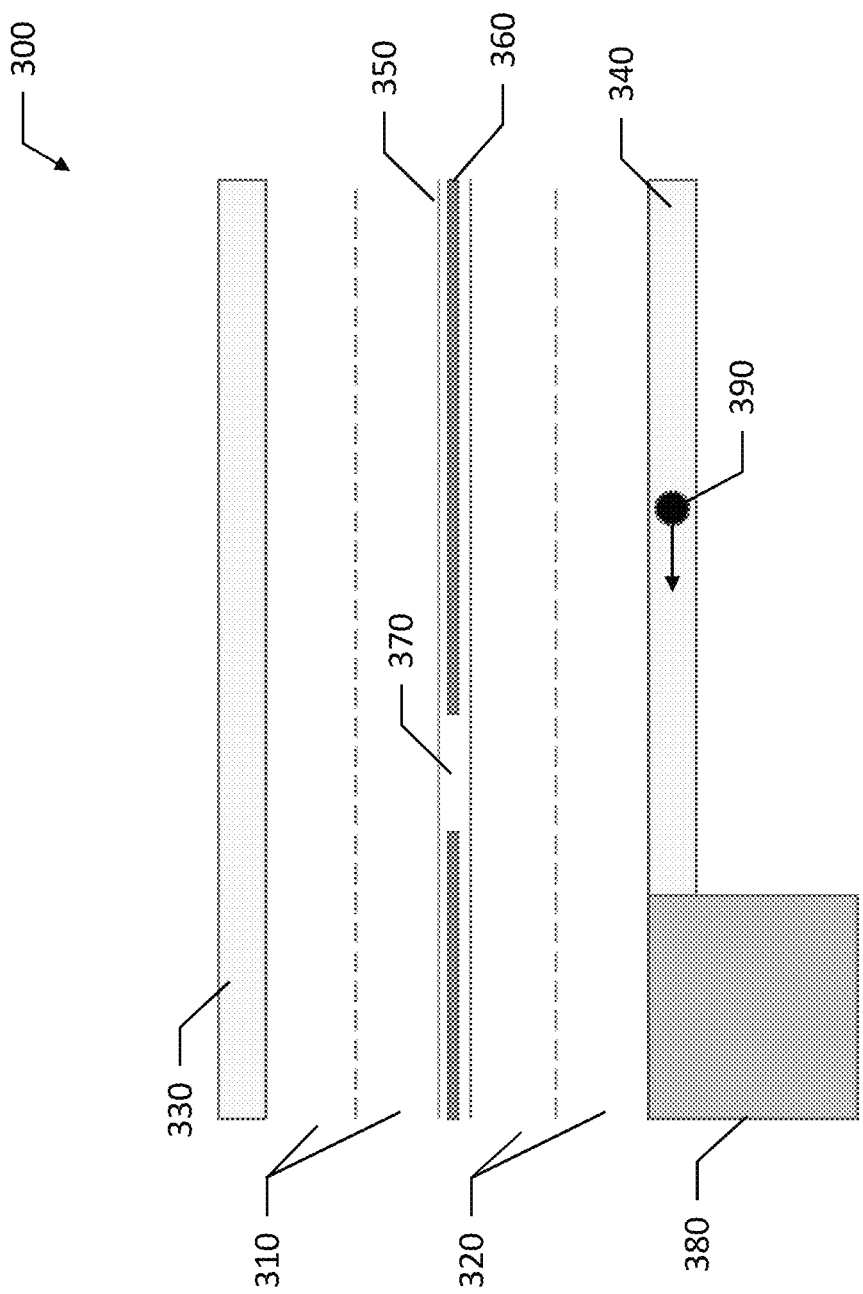
Figure 4:
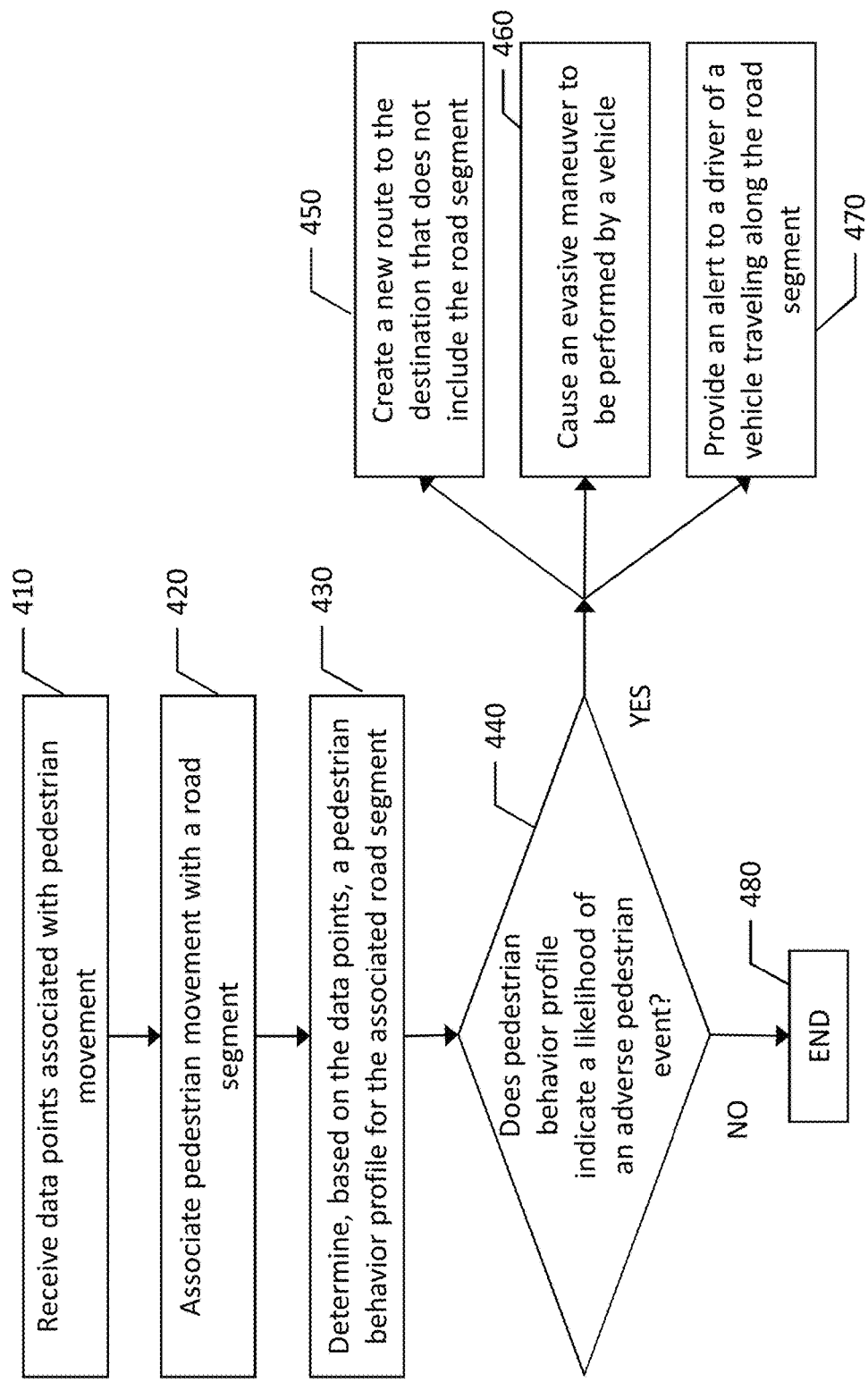

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for determining pedestrian behavior profiles and using them to facilitate assisted driving in accordance with an example embodiment of the present invention;

FIG. 3 is an illustration of a road segment and the geometry of pedestrian walking paths according to an example embodiment of the present invention; and FIG. 4 is a flowchart of a method for generating pedestrian behavior profiles and causing an action in response to the likelihood of an adverse pedestrian event being above a predefined threshold according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus, and computer program product are provided herein in accordance with an example embodiment for using observed behavior from pedestrians to establish where pedestrians are likely to cross road segments of a network of road segments. Accidents involving vehicles and pedestrians can be severe, much more so than vehicle accidents involving objects or other vehicles. Further, while vehicle behavior can be somewhat predictable and relatively reliable (e.g., vehicles tend to travel along roadways within lanes), pedestrian behavior can be much less predictable and reliable. Pedestrians crossing against traffic signals or crossing vehicle travel lanes of a road segment between intersections may make them more vulnerable, particularly as pedestrians are not anticipated to be crossing roads outside of designated pedestrian crossings.

Embodiments described herein may receive pedestrian behavior data, analyze that behavior data, and generate a prediction of the likelihood of a pedestrian crossing a road segment at a particular time of day, day of the week, season of the year, etc. A system, as illustrated in FIG. 1, may enable a user to be alerted or notified of the likelihood of a pedestrian crossing a road segment to allow greater reaction time for a driver or an advanced driver assistance system (ADAS) in the event a pedestrian does cross the road segment in the path of a vehicle.

FIG. 1 illustrates a communication diagram of an example embodiment of a system for implementing example embodiments described herein. The illustrated embodiment of FIG. 1 includes a map developer system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map developer 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

As described further below, the map database 108 may also include information pertaining to pedestrian behavior in or around road segments of the network of road segment. This pedestrian behavior data may be developed based on observed pedestrian behavior gathered through, for example, mobile device tracking of pedestrians or visual detection of pedestrians along a road segment (e.g., through cameras such as traffic cameras). The pedestrian data gathered may include data such as time of day, day of the week, day of the month and year, etc. While embodiments described herein may generally reference pedestrian behavior, behaviors of other types of transportation may be gathered, such as cyclists, which may be distinguished from pedestrians based on their speed or based on the visual detection features.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, pedestrian avoidance, and other functions, by a navigation device, such as by user equipment 104, for example. Further, data may be compiled relating to the behavior of pedestrians within a geographic region. This data can be compiled for temporal clustering of epochs to estimate future pedestrian behavior. The navigation-related functions can correspond to vehicle navigation, pedestrian navigation, or other types of navigation. While example embodiments described herein generally relate to vehicular travel and determining pedestrian behaviors, example embodiments may be implemented for other transportation types, such as bicycles traveling along bike paths. The compilation of data and information to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features and estimated pedestrian behaviors. In such a case, the map database 108 can be downloaded or stored on the end user device (user equipment 104) which can access the map database 108 through a wireless or wired connection, such as via a processing server 102 and/or the network 112, for example.

In one embodiment, the end user device or user equipment 104 can be an in-vehicle navigation system, such as an advanced driver assistance system (ADAS), a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

The processing server 102 may receive probe data, directly or indirectly, from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle, or in some cases, the position of a pedestrian or cyclist. This data also referred to generally herein as "probe data", may be collected by any device capable of determining the necessary information, and providing the necessary information to a remote entity. The mobile device 114 is one example of a device that can function as a probe to collect probe data of a vehicle or probe data from a pedestrian.

More specifically, probe data (e.g., collected by mobile device 114) may be representative of the location of a vehicle at a respective point in time and may be collected while a vehicle is traveling along a route, or indicative of the location of a pedestrian at a respective point in time and may be collected while a pedestrian is walking along a path. While probe data is described herein as being vehicle probe data, example embodiments may be implemented with pedestrian probe data, or non-motorized vehicle probe data (e.g., from bicycles, skate boards, horseback, etc.). According to the example embodiments described below with the probe data being from motorized vehicles traveling along roadways and pedestrians traveling proximate or across said roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114 may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present invention for determining pedestrian behavior profile, and more particularly, to providing information regarding pedestrian behavior profiles to a device associated with a vehicle to facilitate the avoidance of vehicle-pedestrian accidents. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example embodiments of the present invention may provide a mechanism for establishing a behavior profile of pedestrians in a particular region based on probe data points, data from mobile devices of pedestrians, image-recognition software, or the like. Pedestrian data may be collected through probes that collect data points in the form of an ordered list of GPS (global positioning system) locations where the person has traveled and a time associated with each GPS location. The source of this data may be, for example, a mobile device such as a smart phone or cellular telephone that a person may carry with them, a tracking device attached to a person or an object they are carrying, or any type of device that is capable of recording a location and time for the device. While many devices may transmit this data either in real time (e.g., transmitting a location to a server or map database while the device is at the location), or periodically (e.g., transmitting one or more locations at which the device is located or has been located since the prior transmission), devices may collect this data and store it locally, such as on a fitness tracking device, where that stored data may be later uploaded to a server or map database, for example when the device connects to a home network (e.g., Wi-Fi), or the like. The probe data from a pedestrian, according to example embodiments described herein does not require real-time location data and the data can be later gathered; however, generally the data points from the probe include both a time (including date) and location.

Additional data may be included with probe data, such as a person's heading, personal identification, environmental conditions, or the like; however, for purposes of the invention described herein, the probe data may at least include location and time, while other data may be superfluous or may be used to provide additional features of the invention. The time associated with probe data may include date and time, while the GPS location may include coordinates, such as longitude and latitude of the location. A heading may include a compass direction or a degree heading, while a speed may be any unit of measure of the speed of the probe. Speed data of a probe may be used to establish that data from a particular probe is from that of a pedestrian. Location data may indicate that a probe is traveling along a pedestrian walkway, such as a sidewalk; however, due to inaccuracies in some location systems, such as GPS, and particularly in urban settings, location alone may not be sufficient to establish probe data as belonging to a pedestrian. Speed data may be more reliable in this regard, and may be established by individual probe data points, where the probe data point includes a speed at the time and location of that data point. Optionally, speed may be established through a series of two or more probe data points, determining speed based on the distance traveled over a time between the probe data points.

When a portable device, such as a smart phone or cellular telephone is used for generation of probe data, establishing probe data as pedestrian probe data may not be trivial as it may involve the analysis of a plurality of probe data points over time to establish position, speed, heading, directional changes, routes taken, or the like. For example, a person who is running or walking quickly along a roadway that has heavy traffic may be moving as quickly as the traffic moves, such that speed alone may not be sufficient to establish that the probe data is that of a pedestrian. In such an example, additional data may be used, such as directional change or accelerations. A pedestrian is able to abruptly change direction and change direction in virtually any available direction, whereas vehicles are not nearly as capable. The probe data directional changes or accelerations may be used to contribute to establishing the probe data as that of a pedestrian. Further, probe data may be monitored for a period of time to establish whether or not it is pedestrian or vehicle probe data. For example, if a probe is moving along a roadway at a walking pace, that probe data could be from a pedestrian, or from a vehicle that is in traffic, or possibly searching for a parking space. The probe data from that portion of a probe data trace that is potentially pedestrian may be temporarily stored or flagged as data uncertain of source (e.g., pedestrian or vehicular). If the probe data in that trace following a path accelerates to twenty miles-per-hour, it becomes evident that the probe data or at least a portion thereof, is not pedestrian, and the probe data may be discarded for consideration as pedestrian data.

According to some embodiments, probe data traces may be analyzed in segments to establish whether the probe data is vehicular or pedestrian, as a pedestrian may walk to a vehicle, such as their car, a bus, or a train, and the pedestrian probe data may cease to be pedestrian and become vehicular. The determination of whether probe data is pedestrian or vehicular may further consider whether the probe data trace includes therein a bus stop, train station, or vehicle parking facility along the locations in the trace. The inclusion of such a point of interest may suggest that the probe data trace is transitioning between pedestrian and vehicular probe data.

While example embodiments described herein focus on the collection and analysis of probe data from pedestrians, probe data may also be gathered from vehicles or other objects and other modes of transportation, such as bicycle, train, etc. Probe data may be gathered from devices that are not user-carried, such as a mobile device, but instead are associated with a vehicle, such as the navigation system of a vehicle, or a vehicle-based probe.

Probe data that is gathered may be associated with mapped paths, such as roadways, train routes, bus routes, pedestrian walkways, or the like. Map data, such as the map data contained in map database 108 of the map developer or map service provider 116 may include links, where each roadway in a mapped network comprises a series of interconnected links. Similarly, pedestrian paths may be mapped as a series of interconnected links. Each link is associated with attributes about the geographical segment that they represent. A link may include link geometry data that is a list of coordinates that represent the geographical entity. Links may also include a total length of the geographic segment they represent.

Road segments represented by links can be used in calculating a route or recording a route as traveled. Nodes are end points corresponding to the respective links or segments of the road. Road link data records and node data records may be stored, for example, in map database 108, and may represent a road network. Road links and nodes can be associated with attributes such as geographic coordinates, street names, address ranges, speed limits, turn restrictions at intersections, and other navigation related attributes, as well as points of interest (POIs), such as traffic controls (e.g., stoplights, stop signs, crossings, etc.), fuel stations, hotels, restaurants, museums, stadiums, offices, repair shops, buildings, stores, parks, etc. The map database 108 can include data about places, such as cities, towns, or other communities, and other geographic features, such as bodies of water, mountain ranges, etc. Such place or feature data can be part of POI data or can be associated with POIs or POI data records.

In many cases, roadways and pedestrian paths share a similar or the same path. For example, in urban and many suburban environments, pedestrian paths may be sidewalks or paths adjacent to or proximate to roadways. Pedestrians may not always follow pedestrian paths, and may cross roadways or use roadways for pedestrian traffic, which may pose a problem for vehicles traveling along the roadway. Pedestrians crossing roadways or walking along roadways may cause traffic congestion or may increase the likelihood of vehicle-pedestrian accidents.

Embodiments described herein determine pedestrian behavior profiles for pedestrian behavior around roadways based on collected pedestrian probe data or image recognition, such as from traffic cameras. These pedestrian behavior profiles may be associated with roadways and used to assist drivers and autonomous driving. Drivers and autonomous vehicles may be alerted with regard to the pedestrian behavior profile of a roadway along which they are traveling or plan to travel to enable the vehicle or the driver to raise their level of awareness with respect to pedestrians potentially crossing the roadway. Vehicle systems may optionally be in a state of heightened awareness due to pedestrian behavior profiles, such as where autonomous braking is used, by adjusting the sensitivity of a pedestrian sensor, or preloading the brakes of a vehicle to decrease response time. Further, drivers or autonomous vehicles may travel toward a side of a vehicle lane away from a pedestrian path or change lanes in a multi-lane road to be further from a pedestrian path, which may afford a driver or assisted driver system more time to react should a pedestrian enter the roadway.

According to some example embodiments described herein, pedestrian probe data may be gathered from within a region. The pedestrian probe data may provide copious amounts of data with regard to pedestrian travel paths; however, embodiments described herein may focus primarily on pedestrian travel paths that intersect with roadways. Pedestrian probe data from historical probe data points may be collected and analyzed to establish where and when pedestrians cross roadways, and how frequently it is done at various locations throughout the network of roads.

Pedestrian travel paths in dense urban environments are more likely to cross roadways to reach their destination. Pedestrians crossing a roadway at a crosswalk that is controlled by a traffic signal may not be considered according to example embodiments, as the pedestrian path does not conflict or interfere with a vehicle travel path. However, pedestrians crossing a roadway at a crosswalk against their signal (i.e., during a "don't walk" phase of the pedestrian signal) may be considered in establishing pedestrian behavior profiles. Pedestrian probe data may establish whether a pedestrian is crossing against their signal based on vehicle probe data associated with the intersection through which the crosswalk extends. For example, if a pedestrian crosses a roadway along a crosswalk, and a vehicle travels through that crosswalk at a relatively steady speed (e.g., not accelerating from a stop at the light) within a predetermined amount of time of the pedestrian crossing, or while the pedestrian is still in the cross walk, it may be determined that the pedestrian has crossed against a signal. Similarly, if a pedestrian is traversing a crosswalk while traffic that should accompany the phase of that crosswalk signal (e.g., traffic parallel to the crosswalk) is stopped, it may be determined that the pedestrian has crossed against the signal. A pedestrian path that is established as crossing against a signal may be considered an adverse pedestrian crossing or an adverse pedestrian event, where such a pedestrian crossing against a signal may be considered in establishing pedestrian behavior profiles.

Other example embodiments of probe data that is considered in establishing pedestrian behavior profiles is pedestrian traffic across roadways between intersections. A pedestrian path that crosses a road segment outside of a crosswalk may be considered an adverse pedestrian event. The time of day, day of the week, season of the year, and any special events occurring proximate the pedestrian may be associated with the probe data of the adverse pedestrian event.

Pedestrian behaviors other than adverse pedestrian crossings may optionally be considered in establishing pedestrian behavior profiles. For example, in a scenario in which a road segment has no pedestrian path adjacent, such as a roadway without a sidewalk, or a road segment with a sidewalk closed for construction. In such a scenario, pedestrians may walk on the roadway parallel to the direction of traffic flow such that they are not crossing, but traveling along the roadway. In such a scenario, a pedestrian walking in the roadway may be considered an adverse pedestrian event. Similarly, in road segments adjacent to a park or playground, pedestrians may enter the road to retrieve sporting equipment (e.g., balls, flying discs, etc.) or while playing games, such that an adverse pedestrian event may occur where a pedestrian enters the roadway, but does not cross the roadway.

Adverse pedestrian events may be associated with a road segment, and may be used to determine a pedestrian behavior profile for that road segment. A pedestrian behavior profile may not only provide an indication of a likelihood of an adverse pedestrian event along a road segment, but may also consider the time of day, day of the week or year, whether special events are occurring (e.g., a sporting event or concert), etc. The adverse pedestrian events, possibly coupled with their associated probe data such as time, may be used to generate the pedestrian behavior profiles for a road segment.

Road segments proximate an office building may experience a surge in adverse pedestrian events such as adverse pedestrian crossings during a window of time in the morning, such as 7:00 am-9:00 am, and another surge in the afternoon, such as 4:00 pm-6:00 pm. These time windows may correlate to the start and finish of a typical workday for most of the people in the office building, and may occur only during certain days of the week, such as Monday through Friday. In such an embodiment, the road segment proximate the office building may have a pedestrian behavior profile that indicates that adverse pedestrian events are unlikely on weekends and unlikely outside of a morning window of time and an afternoon window of time. However, during the window of time in the morning and the window of time in the afternoon on Mondays through Fridays, the pedestrian behavior profile for the road segment proximate the office building may indicate that the likelihood of an adverse pedestrian event is high, and that a driver traversing the road segment during one of these windows on a weekday should be cautious or possibly avoid that road segment during those times.

Pedestrian behavior profiles may be used to indicate a variety of pedestrian behaviors. While some behavior profiles may be routine and predictable, such as the example above of a road segment proximate an office building, other pedestrian behavior profiles may not be as routine or regular. For example, during a sporting event at a stadium which may occur sporadically, a plurality of road segments proximate the stadium may each have a significantly increased risk of an adverse pedestrian event. A road segment proximate a church may have a significantly increased risk of an adverse pedestrian event before and after services at the church which may vary depending on the day of the month or season of the year.

While some pedestrian behavior profiles may be conventional and routine such that they are repeatable (e.g., every weekday throughout a year), other pedestrian behavior profiles, as described above, may be event-based. In such a scenario, a calendar of events may be used by example systems to establish when an event is occurring, and when certain pedestrian behavior profiles are active. Optionally, events may be established by systems of example embodiments based on probe data, such as traffic probe data. For example, if a sports stadium has a parking lot that is used only during sporting events, the detection of a plurality of probes entering the parking lot may signal a sporting event, and the pedestrian behavior profile for road segments affected by the sporting event may become active. Optionally, pedestrian probe data may be analyzed to determine an event, such as pedestrian probe data entering a sports venue. In this manner, pedestrian behavior profiles may be stored, for example, by map developer 116 in map database 108 and may become active in response to establishing that an event is occurring. This may supplement pedestrian behavior profiles that are routine and conventional, which are active on a regular schedule and do not require input to establish when the pedestrian behavior profile is active.

In each pedestrian behavior profile, a likelihood of an adverse pedestrian event may be established, and may vary based on the time of day, day of the week, etc. The likelihood of an adverse pedestrian event may be established based on the historic probe data points of pedestrians for a road segment, and thresholds may be used whereby below a first threshold, the pedestrian behavior profile indicates that it is unlikely that a pedestrian will enter the roadway, and above a second threshold there is a high likelihood of a pedestrian entering the roadway. Varying degrees of likelihood may optionally be used by different systems, such as navigation systems or driver awareness systems for alerting drivers. An example may include whereby a driver traveling along a road segment may be alerted to a high likelihood of a pedestrian entering the roadway based on a threshold likelihood, which may be user configured or predetermined.

Pedestrian behavior profiles as described herein may be used to assist with route guidance for a vehicle or navigation system. For example, a user may enter a destination that may use a route that travels along a series of road segments. If, during the time that the user is traveling along the route, a pedestrian behavior profile indicates that one or more of these road segments is likely to experience an adverse pedestrian crossing or event (e.g., the likelihood satisfies a threshold value), the route may be altered by a navigation system to avoid that road segment, particularly if an alternative route is available that does not substantially impact travel time. Such route guidance and avoidance of road segments with a high degree of adverse pedestrian events may minimize vehicle traffic along roads where pedestrians are likely to be found in the roadway, thus reducing the likelihood of a vehicle-pedestrian accident. Further, the likelihood of an adverse pedestrian event may be considered along with the length or duration of alternative routes, such that a decision to re-route a user may consider whether an additional travel distance or time is warranted based on a certain likelihood of an adverse pedestrian event occurring.

According to some example embodiments, a user may be traveling along a road segment in a vehicle where route guidance is either not used, or has directed the user to travel along this road segment. The user may be alerted to the likelihood of a pedestrian entering the roadway through the pedestrian behavior profile, or in the case of an autonomous vehicle or assisted driving, the vehicle (and the advanced driver assistance system) may be aware of the likelihood of the pedestrian entering the roadway. In such a scenario, the vehicle and/or the driver may take evasive action to minimize danger, such as to travel in a vehicle travel lane further away from a pedestrian walkway, or to travel in a lane that is further away from the pedestrian walkway. According to some embodiments, these evasive actions may be taken if the likelihood of an adverse pedestrian event is above a predetermined threshold.

According to some embodiments, the lights of a vehicle may be turned on, either by a recommendation provided to the driver, or through an advanced driver assistance system based on a high likelihood of a pedestrian entering the roadway. The activation of lights of the vehicle may provide higher visibility of the vehicle and reduce the likelihood of a pedestrian not seeing the vehicle, thereby potentially reducing the likelihood that a pedestrian would enter the roadway. Similarly, as many vehicles are now able to travel virtually silently under electric power, or with an engine that is very quiet, a vehicle may engage a supplemental noise while traveling along a roadway with a high likelihood of a pedestrian entering the roadway. This supplemental noise, which may be a simulated engine noise or a noise simply providing an alert that the vehicle is present, may be activated by a user upon recommendation by a device (e.g., the navigation system of the vehicle) or activated by the vehicle itself responsive to receiving the pedestrian behavior profile at an advanced driver assistance system.

Example embodiments described herein may use the pedestrian behavior profiles in conjunction with the detection of pedestrian presence to establish a likelihood that the detected pedestrian will attempt to enter or cross the road segment. A vehicle may be equipped with one or more sensors capable of detecting a pedestrian. For example, RADAR, LiDAR (light detection and ranging), thermal imaging, image sensing, or the like may be used to determine that a pedestrian is present in a field of view in front of the vehicle as the vehicle travels along a road segment. This detection may be based on a confidence level, which may use movement, size, or other factors to establish a confidence level as to whether the detected object is a pedestrian. Based on the detection of the pedestrian, a pedestrian behavior profile may be used to establish a likelihood that the detected pedestrian will enter the roadway. A driver of the vehicle or an advanced driver assistance system may be alerted to the likelihood of the pedestrian entering the roadway, and the driver and/or vehicle may take evasive action if the likelihood satisfies a predetermined threshold.

According to some embodiments, detecting a pedestrian's presence along a road segment may include determining a pedestrian's direction of travel. For example, if a pedestrian is heading toward an intersection and they are close to the intersection, it may be relatively unlikely that the pedestrian will enter the roadway against a pedestrian signal. However, if a pedestrian is walking away from an intersection, they may be more likely to enter the roadway to cross away from the intersection.

While the likelihood of an adverse pedestrian event has been described above with respect to road segments, embodiments may sub-divide road segments and be able to evaluate the likelihood of an adverse pedestrian event along subsections of a road segment. For example, a subsection of a road segment that is near a specific point-of-interest may have a relatively higher likelihood of an adverse pedestrian event such as crossing as it may be relatively common for pedestrians to cross the road segment in front of the point-of-interest to reach the point-of-interest. Points-of-interest such as a restaurant or donut shop, for example, may have an increased likelihood of an adverse pedestrian event or crossing proximate the point-of-interest during normal hours of operation, while when the point-of-interest is closed, the likelihood of an adverse pedestrian event or crossing may decrease.

According to some embodiments, road segment geometry may be considered when establishing the likelihood of an adverse pedestrian event. For example, if a road segment has a short distance between crosswalks, it may be unlikely that a pedestrian will cross outside of a crosswalk, while road segments without a crosswalk or having a relatively long distance between intersections may have an increased likelihood of an adverse pedestrian event. Objects in a road segment may also influence the likelihood that a pedestrian will cross the road segment.

FIG. 3 illustrates an example embodiment of a road segment 300 having four traffic lanes, with two lanes 310 heading in a first direction, and two lanes 320 heading in a second direction, opposite the first direction. A first pedestrian walkway 330, such as a sidewalk, is disposed on a first side of the road segment, while a second pedestrian walkway 340 is disposed on the other side of the road segment, and a median 350 divides the first set of lanes 310 from the second set of lanes 320. Within the median 350 is a fence 360 extending along the median with a break at 370. The fence of the illustrated embodiment is presumed to be of sufficient height to deter a pedestrian from attempting to scale the fence. An obstacle, such as a building or a wall is shown at 380, blocking a portion of the second pedestrian walkway 340.

According to the illustrated embodiment, the pedestrian behavior profile of the road segment 300 may indicate a relatively low likelihood of an adverse pedestrian event, possibly due to the fence 360 making a pedestrian crossing of the road unlikely. However, if there is a chance of an adverse pedestrian crossing on the road segment 300, it is most likely proximate the break 370 in the fence 360. A vehicle may detect a pedestrian 390 walking along the second pedestrian walkway in the direction of the arrow shown. Based on the road segment geometry, embodiments described herein may determine that it is highly likely that the pedestrian 390 will cross proximate the break 370 in the fence 360, particularly since there is an obstruction 380 along the pedestrian walkway 340 beyond the break 370. Thus, an alert may be generated or an action taken by a vehicle responsive to the likelihood of the pedestrian 390 crossing at 370. Conversely, if the pedestrian 390 is walking in a direction opposite of the arrow, it may be established that it is highly unlikely that the pedestrian 390 will attempt to cross the road as there are no obstructions along the second pedestrian walkway 340 and there is an obstacle—the fence 360—that would preclude the pedestrian 390 from reaching the first pedestrian walkway 330.

FIG. 4 illustrates a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 4 illustrates a flowchart of method of providing information regarding pedestrian behavior profiles to a device associated with a vehicle to facilitate avoidance of vehicle-pedestrian accidents. As shown, at 410 data points associated with pedestrian movement are received. This data can be accumulated through mobile devices carried by pedestrians, for example, which may determine when a user is walking or on foot as opposed to in a vehicle or on another form of transportation. The pedestrian movement is associated with a road segment at 420; that is to say, it is map-matched to a road segment within a network of roads. Based on the data points, as shown at 430, a pedestrian behavior profile is determined for the road segment. At 440, a determination is made as to whether the pedestrian behavior profile for a road segment indicates a likelihood of an adverse pedestrian event. The likelihood may be, for example, a percentage of likelihood established based on historical behavior of pedestrians around the road segment, while the adverse event may include a pedestrian entering a roadway either to cross the road segment or to walk along the road segment, for example. If the likelihood of an adverse pedestrian event satisfies a predetermined threshold or criteria, one of three things may occur: a new route to a destination of a vehicle may be created that avoids the road segment, as shown at 450; an evasive maneuver may be caused, as shown at 460, or an alert may be provided to the driver of a vehicle traveling along the road segment as shown at 470. An evasive maneuver may include, for example, the vehicle moving to a different lane, the vehicle slowing down, the vehicle shifting position in a lane of travel, etc. If the likelihood of an adverse pedestrian event is low or below a threshold, no action may be taken and the method may end at 480.

In an example embodiment, an apparatus for performing the method of FIG. 4 above may comprise a processor (e.g., the processor 202) configured to perform some or each of the operations (410-480) described above. The processor may, for example, be configured to perform the operations (410-480) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-480 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A mapping system comprising:
a memory comprising map data; and
processing circuitry configured to:
receive data points associated with pedestrian movement;
associate pedestrian movement with a road segment;
determine pedestrian accessible paths for the road segment;
determine pedestrian inaccessible areas proximate the road segment determine, based at least in part on the data points, the pedestrian accessible paths for the road segment, and the pedestrian inaccessible areas proximate the road segment, a pedestrian behavior profile for the road segment; and
in response to the pedestrian behavior profile for the road segment indicating a likelihood for an adverse pedestrian event that satisfies a predetermined likelihood, cause at least one of the following:
re-routing of a route to a destination that includes the road segment to a route to the destination that does not include the road segment;
performance of an evasive maneuver by a vehicle; or
provision of an alert to a driver of a vehicle traveling along the road segment.

2. The mapping system of claim 1, wherein the processing circuitry configured to determine a pedestrian behavior profile for the road segment comprises determining a likelihood for an adverse pedestrian event, wherein the likelihood for an adverse pedestrian event varies over at least one of: time of day, day of the week, or month of the year.

3. The mapping system of claim 1, wherein the processing circuitry is further configured to:
determine the presence of a pedestrian along the road segment; and
establish a likelihood of the pedestrian performing an adverse pedestrian event based, at least in part, on the pedestrian behavior profile for the road segment.

4. The mapping system of claim 3, wherein the processing circuitry configured to determine the presence of a pedestrian along the road segment comprises processing circuitry configured to determine a direction of travel of a pedestrian along the road segment, and wherein the processing circuitry configured to establish a likelihood of the pedestrian performing an adverse pedestrian event is based, at least in part, on the direction of travel of the pedestrian.

5. The mapping system of claim 1, wherein an evasive maneuver comprises one or more of: changing a travel lane of a vehicle; repositioning a vehicle in a width of a lane of travel relative to a pedestrian walkway; or adjusting a speed of a vehicle.

6. The mapping system of claim 1, wherein in response to the pedestrian behavior profile for the road segment indicating a likelihood for an adverse pedestrian event that satisfies a predetermined likelihood, cause at least one of: activating lights of a vehicle traveling along the road segment; or activating an audible tone of a vehicle traveling along the road segment.

7. The mapping system of claim 1, wherein an adverse pedestrian event comprises a pedestrian entering a vehicle travel lane of the road segment.

8. An apparatus comprising at least one processor and at least one memory including computer program code, the at least one memory and computer program code configured to, with the processor, cause the apparatus to at least:
receive data points associated with pedestrian movement;
associate pedestrian movement with a road segment;
determine pedestrian accessible paths for the road segment;
determine pedestrian inaccessible areas proximate the road segment determine, based at least in part on the data points, the pedestrian accessible paths for the road segment, and the pedestrian inaccessible areas proximate the road segment, a pedestrian behavior profile for the road segment; and
in response to the pedestrian behavior profile for the road segment indicating a likelihood for an adverse pedestrian event that satisfies a predetermined likelihood, cause the apparatus to perform at least one of the following:
re-route a route to a destination that includes the road segment to a route to the destination that does not include the road segment;
cause an evasive maneuver to be performed by a vehicle; or
provide an alert to a driver of a vehicle traveling along the road segment.

9. The apparatus of claim 8, wherein causing the apparatus to determine a pedestrian behavior profile for the road segment comprises causing the apparatus to determine a likelihood for an adverse pedestrian event, wherein the likelihood for an adverse pedestrian event varies over at least one of: time of day, day of the week, or month of the year.

10. The apparatus of claim 8, wherein the apparatus is further caused to:
determine the presence of a pedestrian along the road segment; and
establish a likelihood of the pedestrian performing an adverse pedestrian event based, at least in part, on the pedestrian behavior profile for the road segment.

11. The apparatus of claim 10, wherein causing the apparatus to determine the presence of a pedestrian along the road segment comprises causing the apparatus to determine a direction of travel of a pedestrian along the road segment, and wherein causing the apparatus to establish a likelihood of the pedestrian performing an adverse pedestrian event is based, at least in part, on the direction of travel of the pedestrian.

12. The apparatus of claim 8, wherein an evasive maneuver comprises one or more of: changing a travel lane of a vehicle; repositioning a vehicle in a width of a lane of travel relative to a pedestrian walkway; or adjusting a speed of a vehicle.

13. The apparatus of claim 8, wherein in response to the pedestrian behavior profile for the road segment indicating a likelihood for an adverse pedestrian event that satisfies a predetermined likelihood, cause at least one of activating lights of a vehicle traveling along the road segment or activating an audible tone of a vehicle traveling along the road segment.

14. The apparatus of claim 8, wherein an adverse pedestrian event comprises a pedestrian entering a vehicle travel lane of the road segment.

15. A computer program product comprising at least one non-transitory computer readable storage medium having computer-executable program code portions stored therein, the computer-executable program code portions comprising program code instructions configured to:
receive data points associated with pedestrian movement;
associate pedestrian movement with a road segment;
determine pedestrian accessible paths for the road segment;
determine pedestrian inaccessible areas proximate the road segment determine, based at least in part on the data points, the pedestrian accessible paths for the road segment, and the pedestrian inaccessible areas proximate the road segment, a pedestrian behavior profile for the road segment; and
in response to the pedestrian behavior profile for the road segment indicating a likelihood for an adverse pedestrian event that satisfies a predetermined likelihood, cause the apparatus to perform at least one of the following:
re-route a route to a destination that includes the road segment to a route to the destination that does not include the road segment;
cause an evasive maneuver to be performed by a vehicle; or
provide an alert to a driver of a vehicle traveling along the road segment.

16. The computer program product of claim 15, wherein the program code instructions configured to determine a pedestrian behavior profile for the road segment comprises program code instructions to determine a likelihood for an adverse pedestrian event, wherein the likelihood for an adverse pedestrian event varies over at least one of: time of day, day of the week, or month of the year.

17. The computer program product of claim 15, further comprising program code instructions to:
determine the presence of a pedestrian along the road segment; and
establish a likelihood of the pedestrian performing an adverse pedestrian event based, at least in part, on the pedestrian behavior profile for the road segment.

18. The computer program product of claim 17, wherein the program code instructions to determine the presence of a pedestrian along the road segment comprises program code instructions to determine a direction of travel of a pedestrian along the road segment, and wherein the program code instructions to establish a likelihood of the pedestrian performing an adverse pedestrian event is based, at least in part, on the direction of travel of the pedestrian.

19. The mapping system of claim 1, wherein a pedestrian accessible path comprises a path across the road segment lacking obstructions that would preclude a pedestrian from traversing the road segment.

20. The mapping system of claim 1, wherein a pedestrian inaccessible area comprises at least one obstruction that precludes a pedestrian from crossing the road segment.

* * * * *